(12) United States Patent
Hodge et al.

(10) Patent No.: US 10,057,398 B2
(45) Date of Patent: *Aug. 21, 2018

(54) SYSTEM AND METHOD FOR DETECTING THREE-WAY CALL CIRCUMVENTION ATTEMPTS

(71) Applicant: Value-Added Communications, Inc., Reston, VA (US)

(72) Inventors: Stephen L. Hodge, Aubry, TX (US); Fred Kesterson, Parker, TX (US); Serge Seyfetdinov, Plano, TX (US)

(73) Assignee: Value-Added Communications, Inc., Reston, VA (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/919,402

(22) Filed: Oct. 21, 2015

(65) Prior Publication Data

US 2016/0044161 A1 Feb. 11, 2016

Related U.S. Application Data

(63) Continuation of application No. 13/958,137, filed on Aug. 2, 2013, now Pat. No. 9,225,838, which is a
(Continued)

(51) Int. Cl.
*H04M 1/67* (2006.01)
*H04M 1/02* (2006.01)
(Continued)

(52) U.S. Cl.
CPC ............. *H04M 1/67* (2013.01); *H04M 1/02* (2013.01); *H04M 3/205* (2013.01);
(Continued)

(58) Field of Classification Search
CPC ........ H04M 3/2281; H04M 3/38; H04M 1/82; H04M 1/68; H04M 1/67; H04M 15/47; H04M 3/2272; H04M 2203/6027
(Continued)

(56) References Cited

U.S. PATENT DOCUMENTS 3,406,344 A 10/1968 Hopper
3,801,747 A 4/1974 Queffeulou et al.
(Continued)

FOREIGN PATENT DOCUMENTS

EP 1280137 B1 12/2004
GB 2075 313 A 11/1981
(Continued)

OTHER PUBLICATIONS

Bender, W., et al., "Techniques For Data Hiding," IBM Systems Journal, vol. 35, Nos. 3&4, 1996.
(Continued)

*Primary Examiner* — Jesse A Elbin
(74) *Attorney, Agent, or Firm* — Sterne, Kessler, Goldstein & Fox P.L.L.C.

(57) ABSTRACT

Disclosed is a three-way call detection system and method for use with a telephone management system. Specifically, a three-way call detection system and method for detecting continuous noise indicative of an attempt to mask a three-way call attempt. The continuous noise detection system and method may be stand alone or used in conjunction with any existing three-way call detection system and method.

18 Claims, 7 Drawing Sheets

Related U.S. Application Data continuation-in-part of application No. 12/378,244, filed on Feb. 12, 2009, now Pat. No. 8,630,726.

(51) Int. Cl.
*H04M 3/56* (2006.01)
*H04M 3/22* (2006.01)
*H04M 3/20* (2006.01)
*H04M 1/68* (2006.01)
*H04M 15/00* (2006.01)
*H04M 3/42* (2006.01)

(52) U.S. Cl.
CPC .......... *H04M 3/2281* (2013.01); *H04M 3/56* (2013.01); *H04M 3/568* (2013.01); *H04M 1/68* (2013.01); *H04M 3/42314* (2013.01); *H04M 15/47* (2013.01); *H04M 2203/6027* (2013.01)

(58) Field of Classification Search
USPC ..... 700/94; 381/58; 379/2, 22.03, 24, 29.03, 379/93.02, 114.14, 168, 189, 199, 207.06, 379/377
See application file for complete search history.

(56) References Cited

U.S. PATENT DOCUMENTS

| | | |
|---|---|---|
| 3,985,956 A | 10/1976 | Monti et al. |
| 4,028,496 A | 6/1977 | LaMarche et al. |
| 4,054,756 A | 10/1977 | Comella et al. |
| 4,191,860 A | 3/1980 | Weber |
| 4,670,628 A | 6/1987 | Boratgis et al. |
| 4,691,347 A | 9/1987 | Stanley et al. |
| 4,703,476 A | 10/1987 | Howard |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,935,956 A | 6/1990 | Hellwarth et al. |
| 4,943,973 A | 7/1990 | Werner |
| 4,995,030 A | 2/1991 | Helf |
| 5,229,764 A | 7/1993 | Matchett et al. |
| 5,291,548 A | 3/1994 | Tsumura et al. |
| 5,319,702 A | 6/1994 | Kitchin et al. |
| 5,319,735 A | 6/1994 | Preuss et al. |
| 5,345,595 A | 9/1994 | Johnson et al. |
| 5,379,345 A | 1/1995 | Greenberg |
| 5,425,091 A | 6/1995 | Josephs |
| 5,438,616 A | 8/1995 | Peoples |
| 5,483,593 A | 1/1996 | Gupta et al. |
| 5,502,762 A | 3/1996 | Andrew et al. |
| 5,535,194 A | 7/1996 | Ashley et al. |
| 5,535,261 A | 7/1996 | Brown et al. |
| 5,539,731 A | 7/1996 | Haneda et al. |
| 5,539,812 A | 7/1996 | Kitchin et al. |
| 5,555,551 A | 9/1996 | Rudokas et al. |
| 5,583,925 A | 12/1996 | Bernstein |
| 5,590,171 A | 12/1996 | Howe et al. |
| 5,592,548 A | 1/1997 | Sih |
| 5,613,004 A | 3/1997 | Cooperman et al. |
| 5,619,561 A | 4/1997 | Reese |
| 5,623,539 A | 4/1997 | Bassenyemukasa et al. |
| 5,634,086 A | 5/1997 | Rtischev et al. |
| 5,636,292 A | 6/1997 | Rhoads |
| 5,640,490 A | 6/1997 | Hansen et al. |
| 5,646,940 A | 7/1997 | Hotto |
| 5,649,060 A | 7/1997 | Ellozy et al. |
| 5,655,013 A | 8/1997 | Gainsboro |
| 5,675,704 A | 10/1997 | Juang et al. |
| 5,687,236 A | 11/1997 | Moskowitz et al. |
| 5,710,834 A | 1/1998 | Rhoads |
| 5,719,937 A | 2/1998 | Warren et al. |
| 5,745,558 A | 4/1998 | Richardson, Jr. et al. |
| 5,745,569 A | 4/1998 | Moskowitz et al. |
| 5,745,604 A | 4/1998 | Rhoads |
| 5,748,726 A | 5/1998 | Unno |
| 5,748,763 A | 5/1998 | Rhoads |
| 5,748,783 A | 5/1998 | Rhoads |
| 5,757,889 A | 5/1998 | Ohtake |
| 5,768,355 A | 6/1998 | Salibrici et al. |
| 5,768,426 A | 6/1998 | Rhoads |
| 5,774,452 A | 6/1998 | Wolosewicz |
| 5,796,811 A | 8/1998 | McFarlen |
| 5,802,145 A | 9/1998 | Farris et al. |
| 5,805,685 A | 9/1998 | McFarlen |
| 5,809,462 A | 9/1998 | Nussbaum |
| 5,822,432 A | 10/1998 | Moskowitz et al. |
| 5,822,436 A | 10/1998 | Rhoads |
| 5,822,726 A | 10/1998 | Taylor et al. |
| 5,832,119 A | 11/1998 | Rhoads |
| 5,835,486 A | 11/1998 | Davis et al. |
| 5,841,886 A | 11/1998 | Rhoads |
| 5,841,978 A | 11/1998 | Rhoads |
| 5,850,481 A | 12/1998 | Rhoads |
| 5,862,260 A | 1/1999 | Rhoads |
| 5,867,562 A | 2/1999 | Scherer |
| 5,883,945 A | 3/1999 | Richardson, Jr. et al. |
| 5,889,568 A | 3/1999 | Seraphim et al. |
| 5,889,868 A | 3/1999 | Moskowitz et al. |
| 5,899,972 A | 5/1999 | Miyazawa et al. |
| 5,907,602 A | 5/1999 | Peel et al. |
| 5,920,834 A | 7/1999 | Sih et al. |
| 5,926,533 A | 7/1999 | Gainsboro |
| 5,930,369 A | 7/1999 | Cox et al. |
| 5,930,377 A | 7/1999 | Powell et al. |
| 5,953,049 A | 9/1999 | Horn et al. |
| 5,960,080 A | 9/1999 | Fahlman et al. |
| 5,963,909 A | 10/1999 | Warren et al. |
| 5,982,891 A | 11/1999 | Ginter et al. |
| 5,999,828 A | 12/1999 | Sih et al. |
| 6,011,849 A | 1/2000 | Orrin |
| 6,026,193 A | 2/2000 | Rhoads |
| 6,035,034 A | 3/2000 | Trump |
| 6,052,454 A | 4/2000 | Kek et al. |
| 6,052,462 A | 4/2000 | Lu |
| 6,064,963 A | 5/2000 | Gainsboro |
| 6,072,860 A | 6/2000 | Kek et al. |
| 6,078,567 A | 6/2000 | Traill et al. |
| 6,078,645 A | 6/2000 | Cai et al. |
| 6,078,807 A | 6/2000 | Dunn et al. |
| 6,111,954 A | 8/2000 | Rhoads |
| 6,122,392 A | 9/2000 | Rhoads |
| 6,122,403 A | 9/2000 | Rhoads |
| 6,138,119 A | 10/2000 | Hall et al. |
| 6,140,956 A | 10/2000 | Hillman et al. |
| 6,141,406 A | 10/2000 | Johnson |
| 6,141,415 A | 10/2000 | Rao |
| 6,157,707 A | 12/2000 | Baulier et al. |
| 6,160,903 A | 12/2000 | Hamid et al. |
| 6,185,416 B1 | 2/2001 | Rudokas et al. |
| 6,185,683 B1 | 2/2001 | Ginter et al. |
| 6,205,249 B1 | 3/2001 | Moskowitz |
| 6,219,640 B1 | 4/2001 | Basu et al. |
| 6,233,347 B1 | 5/2001 | Chen et al. |
| 6,237,786 B1 | 5/2001 | Ginter et al. |
| 6,243,480 B1 | 6/2001 | Zhao et al. |
| 6,243,676 B1 | 6/2001 | Witteman |
| 6,253,193 B1 | 6/2001 | Ginter et al. |
| 6,263,507 B1 | 7/2001 | Ahmad et al. |
| 6,266,430 B1 | 7/2001 | Rhoads |
| 6,278,772 B1 | 8/2001 | Bowater et al. |
| 6,278,781 B1 | 8/2001 | Rhoads |
| 6,289,108 B1 | 9/2001 | Rhoads |
| 6,298,122 B1 | 10/2001 | Horne |
| 6,301,360 B1 | 10/2001 | Bocionek et al. |
| 6,312,911 B1 | 11/2001 | Bancroft et al. |
| 6,314,192 B1 | 11/2001 | Chen et al. |
| 6,324,573 B1 | 11/2001 | Rhoads |
| 6,324,650 B1 | 11/2001 | Ogilvie |
| 6,327,352 B1 | 12/2001 | Betts et al. |
| 6,330,335 B1 | 12/2001 | Rhoads |
| 6,343,138 B1 | 1/2002 | Rhoads |
| 6,343,738 B1 | 2/2002 | Ogilvie |
| 6,345,252 B1 | 2/2002 | Beigi et al. |

(56) References Cited

U.S. PATENT DOCUMENTS

| | | |
|---|---|---|
| 6,385,548 B2 | 5/2002 | Ananthaiyer et al. |
| 6,389,293 B1 | 5/2002 | Clore |
| 6,421,645 B1 | 7/2002 | Beigi et al. |
| 6,526,380 B1 | 2/2003 | Thelen et al. |
| 6,542,602 B1 | 4/2003 | Elazar |
| 6,549,587 B1 | 4/2003 | Li |
| 6,584,138 B1 | 6/2003 | Neubauer et al. |
| 6,614,781 B1 | 9/2003 | Elliott et al. |
| 6,625,587 B1 | 9/2003 | Erten et al. |
| 6,633,846 B1 | 10/2003 | Bennett et al. |
| 6,647,096 B1 | 11/2003 | Milliorn et al. |
| 6,665,376 B1 | 12/2003 | Brown |
| 6,665,644 B1 | 12/2003 | Kanevsky et al. |
| 6,671,292 B1 | 12/2003 | Haartsen |
| 6,728,682 B2 | 4/2004 | Fasciano |
| 6,748,356 B1 | 6/2004 | Beigi et al. |
| 6,760,697 B1 | 7/2004 | Neumeyer et al. |
| 6,763,099 B1 | 7/2004 | Blink |
| 6,788,772 B2 | 9/2004 | Barak et al. |
| 6,792,030 B2 | 9/2004 | Lee et al. |
| 6,810,480 B1 | 10/2004 | Parker et al. |
| 6,873,617 B1 | 3/2005 | Karras |
| 6,880,171 B1 | 4/2005 | Ahmad et al. |
| 6,895,086 B2 | 5/2005 | Martin |
| 6,898,612 B1 | 5/2005 | Parra et al. |
| 6,907,387 B1 | 6/2005 | Reardon |
| 7,035,386 B1 | 4/2006 | Susen et al. |
| 7,039,585 B2 | 5/2006 | Wilmot et al. |
| 7,050,918 B2 | 5/2006 | Pupalaikis et al. |
| 7,079,636 B1 | 7/2006 | McNitt et al. |
| 7,079,637 B1 | 7/2006 | McNitt et al. |
| 7,103,549 B2 | 9/2006 | Bennett et al. |
| 7,106,843 B1 | 9/2006 | Gainsboro et al. |
| 7,123,704 B2 | 10/2006 | Martin |
| 7,133,828 B2 | 11/2006 | Scarano et al. |
| 7,149,788 B1 | 12/2006 | Gundla et al. |
| 7,197,560 B2 | 3/2007 | Caslin et al. |
| 7,248,685 B2 | 7/2007 | Martin |
| 7,256,816 B2 | 8/2007 | Profanchik et al. |
| 7,277,468 B2 | 10/2007 | Tian et al. |
| 7,333,798 B2 | 2/2008 | Hodge |
| 7,417,983 B2 | 8/2008 | He et al. |
| 7,426,265 B2 | 9/2008 | Chen et al. |
| 7,494,061 B2 | 2/2009 | Reinhold |
| 7,505,406 B1 | 3/2009 | Spadaro et al. |
| 7,519,169 B1 | 4/2009 | Hingoranee et al. |
| 7,522,728 B1 | 4/2009 | Rhoads |
| 7,529,357 B1 | 5/2009 | Rae et al. |
| 7,596,498 B2 | 9/2009 | Basu et al. |
| 7,639,791 B2 | 12/2009 | Hodge |
| 7,664,243 B2 | 2/2010 | Martin |
| 7,765,302 B2 | 7/2010 | Whynot et al. |
| 7,826,604 B2 | 12/2010 | Martin |
| 7,848,510 B2 | 12/2010 | Shaffer et al. |
| 7,853,243 B2 | 12/2010 | Hodge |
| 7,860,114 B1 | 12/2010 | Gallant et al. |
| 7,899,167 B1 | 3/2011 | Rae |
| 7,916,845 B2 | 3/2011 | Rae et al. |
| 7,961,858 B2 | 6/2011 | Polozola et al. |
| 7,961,860 B1 | 6/2011 | McFarlen |
| 8,000,269 B1 | 8/2011 | Rae |
| 8,031,849 B1 | 10/2011 | Apple et al. |
| 8,054,960 B1 | 11/2011 | Gunasekara |
| 8,059,656 B1 | 11/2011 | Telikepalli et al. |
| 8,059,790 B1 | 11/2011 | Paterik et al. |
| 8,090,082 B2 | 1/2012 | Gilbert |
| 8,130,662 B1 | 3/2012 | Goode et al. |
| 8,345,850 B2 | 1/2013 | Hodge |
| 8,351,581 B2 | 1/2013 | Mikan |
| 8,396,200 B2 | 3/2013 | Hodge et al. |
| 8,542,802 B2 | 9/2013 | Olligschlaeger |
| 8,630,726 B2 | 1/2014 | Hodge et al. |
| 8,731,934 B2 | 5/2014 | Olligschlaeger et al. |
| 8,869,275 B2 | 10/2014 | Zhao et al. |
| 8,886,663 B2 | 11/2014 | Gainsboro et al. |
| 8,929,525 B1 | 1/2015 | Edwards |
| 8,942,356 B2 | 1/2015 | Olligschlaeger |
| 8,953,583 B2 | 2/2015 | Swaminathan et al. |
| 8,953,758 B2 | 2/2015 | Kumar |
| 9,031,057 B2 | 5/2015 | Long et al. |
| 9,143,610 B2 | 9/2015 | Hodge |
| 9,225,838 B2 | 12/2015 | Hodge et al. |
| 9,253,439 B2 | 2/2016 | Andrada et al. |
| 9,614,974 B1 | 4/2017 | Hodge et al. |
| 9,621,732 B2 | 4/2017 | Olligschlaeger |
| 9,667,667 B2 | 5/2017 | Silver et al. |
| 2001/0056349 A1 | 12/2001 | St. John |
| 2001/0056461 A1 | 12/2001 | Kampe et al. |
| 2002/0002464 A1 | 1/2002 | Petrushin |
| 2002/0010587 A1 | 1/2002 | Pertrushin |
| 2002/0032566 A1 | 3/2002 | Tzirkel-Hancock et al. |
| 2002/0184373 A1 | 12/2002 | Maes |
| 2003/0023444 A1 | 1/2003 | St. John |
| 2003/0040326 A1 | 2/2003 | Levy et al. |
| 2003/0063578 A1 | 4/2003 | Weaver |
| 2003/0076815 A1 | 4/2003 | Miller et al. |
| 2003/0086541 A1* | 5/2003 | Brown ............... H04M 3/4228 379/88.01 |
| 2003/0086546 A1 | 5/2003 | Falcone et al. |
| 2003/0088421 A1 | 5/2003 | Maes et al. |
| 2004/0029564 A1 | 2/2004 | Hodge |
| 2004/0047437 A1 | 3/2004 | Hamiti et al. |
| 2004/0162726 A1 | 8/2004 | Chang |
| 2004/0196867 A1 | 10/2004 | Ejzak et al. |
| 2004/0249650 A1 | 12/2004 | Freedman et al. |
| 2004/0252184 A1 | 12/2004 | Hesse et al. |
| 2005/0010411 A1 | 1/2005 | Rigazio et al. |
| 2005/0014491 A1 | 1/2005 | Johnson |
| 2005/0060411 A1 | 3/2005 | Coulombe et al. |
| 2005/0080625 A1 | 4/2005 | Bennett et al. |
| 2005/0083912 A1 | 4/2005 | Afshar et al. |
| 2005/0114192 A1 | 5/2005 | Tor et al. |
| 2005/0125226 A1 | 6/2005 | Magee |
| 2005/0128283 A1 | 6/2005 | Bulriss et al. |
| 2005/0141694 A1 | 6/2005 | Wengrovitz |
| 2005/0144004 A1 | 6/2005 | Bennett et al. |
| 2005/0182628 A1 | 8/2005 | Choi |
| 2005/0207541 A1 | 9/2005 | Cote |
| 2006/0064037 A1 | 3/2006 | Shalon et al. |
| 2006/0087554 A1 | 4/2006 | Boyd et al. |
| 2006/0087555 A1 | 4/2006 | Boyd et al. |
| 2006/0094472 A1 | 5/2006 | Othmer et al. |
| 2006/0198504 A1 | 9/2006 | Shemisa et al. |
| 2006/0200353 A1 | 9/2006 | Bennett |
| 2006/0209794 A1 | 9/2006 | Bae et al. |
| 2006/0285650 A1 | 12/2006 | Hodge |
| 2006/0285665 A1 | 12/2006 | Wasserblat et al. |
| 2007/0011235 A1 | 1/2007 | Mutikainen et al. |
| 2007/0022289 A1 | 1/2007 | Alt et al. |
| 2007/0047734 A1 | 3/2007 | Frost |
| 2007/0071206 A1 | 3/2007 | Gainsboro et al. |
| 2007/0185717 A1 | 8/2007 | Bennett |
| 2007/0206568 A1 | 9/2007 | Silver et al. |
| 2007/0237099 A1 | 10/2007 | He et al. |
| 2007/0242658 A1 | 10/2007 | Rae et al. |
| 2007/0244690 A1 | 10/2007 | Peters |
| 2007/0291776 A1 | 12/2007 | Kenrick et al. |
| 2008/0000966 A1 | 1/2008 | Keiser |
| 2008/0021708 A1 | 1/2008 | Bennett et al. |
| 2008/0046241 A1 | 2/2008 | Osburn et al. |
| 2008/0106370 A1 | 5/2008 | Perez et al. |
| 2008/0118045 A1 | 5/2008 | Polozola et al. |
| 2008/0123687 A1 | 8/2008 | Bangalore et al. |
| 2008/0195387 A1 | 8/2008 | Zigel et al. |
| 2008/0198978 A1 | 8/2008 | Olligschlaeger |
| 2008/0201143 A1 | 8/2008 | Olligschlaeger et al. |
| 2008/0201158 A1 | 8/2008 | Johnson et al. |
| 2008/0260133 A1 | 10/2008 | Hodge et al. |
| 2008/0300878 A1 | 12/2008 | Bennett |
| 2008/0319761 A1 | 12/2008 | Da Palma et al. |
| 2008/0320148 A1 | 12/2008 | Capuozzo et al. |
| 2010/0177881 A1 | 7/2010 | Hodge |
| 2010/0202595 A1 | 8/2010 | Hodge et al. |
| 2011/0055256 A1 | 3/2011 | Phillips et al. |

(56) References Cited

U.S. PATENT DOCUMENTS

| | | | |
|---|---|---|---|
| 2012/0069983 | A1 | 3/2012 | Sall |
| 2013/0007293 | A1 | 1/2013 | Den Hartog et al. |
| 2013/0163590 | A1 | 6/2013 | Bouvet et al. |
| 2013/0223304 | A1 | 8/2013 | Tanaka et al. |
| 2013/0230057 | A1 | 9/2013 | Hori et al. |
| 2013/0294335 | A1 | 11/2013 | Suni et al. |
| 2013/0322614 | A1 | 12/2013 | Hodge et al. |
| 2014/0126715 | A1 | 5/2014 | Lum et al. |
| 2015/0078332 | A1 | 3/2015 | Sidhu et al. |
| 2015/0201083 | A1 | 7/2015 | Olligschlaeger |
| 2016/0021163 | A1 | 1/2016 | Lee et al. |
| 2017/0006159 | A1 | 1/2017 | Olligschlaeger |
| 2017/0222832 | A1 | 8/2017 | Silver et al. |

FOREIGN PATENT DOCUMENTS

| | | |
|---|---|---|
| GB | 2075313 A | 11/1981 |
| JP | 59225626 A | 12/1984 |
| JP | 60010821 A | 1/1985 |
| JP | 61135239 A | 6/1986 |
| JP | 3065826 A | 3/1991 |
| WO | PCT/US95/14230 | 11/1995 |
| WO | WO 98/027768 | 6/1998 |

OTHER PUBLICATIONS

Boney, L., et al., "Digital Watermarks for Audio Signals" Proceedings of the International Conference on Multimedia Computing Systems, p. 473-480, IEEE Computer Society Press, United States (1996).

Boney, L., et al., "Digital Watermarks for Audio Signals" Proceedings of EUSIPC0-96, Eighth European Signal processing Conference, Trieste, Italy, 10-13 (1996).

Cox, I. J., et al.; "Secure Spread Spectrum Watermarking for Multimedia," NEC Research Institute, Technical Report 95-10 (1995).

Christel, M. G., et al., "Interactive Maps for a Digital Video Library", IEEE Special Edition on Multimedia Computing, pp. 60-67, IEEE, United States (2000).

Lane, I. R., et al., "Language Model Switching Based on Topic Detection for Dialog Speech Recognition," Proceedings of the IEEE—ICASSP, vol. 1, pp. 616-619, IEEE, United States (2003).

Olligschlaeger, A. M., Criminal Intelligence Databases and Applications, in Marilyn B. Peterson, Bob Morehouse, and Richard Wright, Intelligence 2000: Revising the Basic Elements—A Guide for Intelligence Professionals, 2000, a joint publication of IALEIA and LEIU, United States.

Silberg, L. "Digital on Call," HFN The Weekly Newspaper for the Home Furnishing Network, p. 97, Mar. 17, 1997.

Audioconferencing options. (Teleconference Units, Conference Bridges and Sevice Bureaus) (includes related articles on speech processing and new conferencing technology), Frankel, Elana, Teleconnect, v.14 n.5, p. 131(3), May 1996.

Coherent Announces Industry's First Remote Management System for Echo Cancellers, Business Wire, Mar. 3, 1997.

Inmate Telephone Services: Large Business: Voice, Oct. 2, 2001.
National Alliance of Gang Investigators Associations, 2005 National Gang Threat Assessment, 2005, pp. vi and 5-7, Bureau of Justice Assistance, Office of Justice Programs, U.S. Department of Justice.

National Major Gang Task Force, A Study of Gangs and Security Threat Groups in America's Adult Prisons and Jails, 2002, United States.

Newton's Telecom Dictionary, 18th Edition, Feb. 2002, p. 168, section "coding theory".

Office of the Inspector General, Department of Justice, Criminal Calls: A Review of the Bureau of Prisons' Management of Inmate Telephone Privileges, Chapter 4, 1999, United States.

Statement for the Record of John S. Pistole, Assistant Director, Counterterrorism Division, Federal Bureau of Investigation, Before the Senate Judiciary Committee, Subcommittee on Terrorism, Technology, and Homeland Security, Oct. 14, 2003.

International Search Report for International Application No. PCT/US04/025029, European Patent Office, Netherlands, dated Mar. 14, 2006.

Supplementary European Search Report for EP Application No. EP 04 80 9530, Munich, Germany, dated Mar. 25, 2009.

Office Action dated Dec. 1, 2011, in Canadian Patent Application No. 2,534,767, DSI-ITI, LLC, filed Aug. 4, 2004.

Final Office Action, dated Jun. 1, 2011, in U.S. Appl. No. 11/819,834, filed Jun. 29, 2007.

Non-Final Office Action, dated Sep. 22, 2010, U.S. Appl. No. 11/819,834, filed Jun. 29, 2007.

Final Office Action, dated Nov. 28, 2011, in U.S. Appl. No. 12/032,200, filed Feb. 15, 2008.

Non-Final Office Action, dated May 3, 2011, in U.S. Appl. No. 12/032,200, filed Feb. 15, 2008.

Amendment and Response Under 37 C.F.R. 1.111, dated Sep. 30, 2011, in U.S. Appl. No. 11/706,431.

Office action dated Mar. 30, 2011 in U.S. Appl. No. 11/706,431, filed Feb. 15, 2007.

Final Office Action, dated Oct. 17, 2011, in U.S. Appl. No. 11/706,431, filed Feb. 15, 2007.

Notice of Allowance for U.S. Appl. No. 12/378,244, dated Sep. 9, 2013; 10 pages.

Non-Final Office Action for U.S. Appl. No. 12/378,244, dated Oct. 31, 2012; 12 pages.

Final Office Action for U.S. Appl. No. 12/378,244, dated Mar. 8, 2013; 13 pages.

Notice of Allowance for U.S. Appl. No. 13/958,137, dated May 19, 2015; 8 pages.

Non-Final Office Action for U.S. Appl. No. 13/958,137, dated Dec. 18, 2014; 15 pages.

Notice of Allowance for U.S. Appl. No. 13/958,137, dated Aug. 19, 2015; 7 pages.

"Criminal Calls: A Review of the Bureau of Prisons' Management of Inmate Telephone Privileges," Chapter 4, U.S. Department of Justice, Office of the Inspector Genaral, Aug. 1999; 14 pages.

File History of U.S. Pat. No. 9,225,838, U.S. Appl. No. 13/958,137, filed Aug. 2, 2013.

File History of U.S. Pat. No. 8,630,726, U.S. Appl. No. 12/378,244, filed Feb. 12, 2009.

"Audio/Video Transport (avt)," Internet Archive Wayback Machine, Oct. 16, 2002, retrieved from http://web.archive.org/web/20021016171815/http://www.ietf.org:80/html.charters/avt-charter.html.

"Cisco IAD2400 Series Business-Class Integrated Access Device", Cisco Systems Datasheet, 2003.

"Internet Protocol DARPA Internet Program Protocol Specification," Defense Advanced Research Projects Agency, RFC 791, Sep. 1981; 50 pages.

"Overview of the IETF," Internet Archive Wayback Machine, Aug. 2, 2002, retrieved from http://web.archive.org/web/20020802043453/www.ietf.org/overview.html.

"SIP and IPLinkTM in the Next Generation Network: An Overview," Intel, 2001.

"Voice Over Packet in Next Generation Networks: An Architectural Framework," Bellcore, Special Report SR-4717, Issue 1, Jan. 1999.

"Cool Edit Pro, Version 1.2 User Guide," Syntrillium Software Corporation, 1998.

"Global Call API for Linux and Windows Operating Systems," Intel Dialogic Library Reference, Dec. 2005.

"The NIST Year 2002 Speaker Recognition Evaluation Plan," NIST, Feb. 27, 2002, accessible at http://www.itl.nist.gov/iad/mig/tests/spk/2002/2002-spkrecevalplan-v60.pdf.

Andreas M. Olligschlaeger, Criminal Intelligence Databases and Applications, in Marilyn B. Peterson, Bob Morehouse, and Richard Wright, Intelligence 2000: Revising the Basic Elements—A Guide for Intelligence Professionals, 2000, a joint publications of IALEIA and LEIU, United States.

(56) References Cited

OTHER PUBLICATIONS

Auckenthaler, et al., "Speaker-Centric Score Normalization and Time Pattern Analysis for Continuous Speaker Verification," International Conference on Acoustics, Speech, and Signal Processing (ICASSP), vol. 2, Jun. 2000, pp. 1065-1068.
Audacity Team, "About Audacity," World Wide Web, 2014, accessible at http://wiki.audacity.team.org/wiki/About_Audacity.
Beigi, et al., "A Hierarchical Approach to Large-Scale Speaker Recognition," EuroSpeech 1999, Sep. 1999, vol. 5; pp. 2203-2206.
Beigi, et al., "IBM Model-Based and Frame-By-Frame Speaker-Recognition," Speaker Recognition and its Commercial and Forensic Applications, Apr. 1998; pp. 1-4.
Beigi, H., "Challenges of Large-Scale Speaker Recognition," 3rd European Cooperation in the Field of Scientific and Technical Research Conference, Nov. 4, 2005.
Beigi, H., "Decision Theory," Fundamentals of Speaker Recognition, Chapter 9, Springer US, 2011; pp. 313-339.
Black, U., Voice Over IP, Second Edition, Prentice Hall 2002; 361 pages.
Boersma, et al., "Praat: Doing Phonetics by computer," World Wide Web, 2015, accessible at http://www.fon.hum.uva.nl/praat.
Bolton, et al., "Statistical Fraud Detection: A Review," Statistical Science, vol. 17, No. 3 (2002), pp. 235-255.
BubbleLINK® Software Architecture (Science Dynamics 2003).
Bur Goode, Voice Over Internet Protocol (VoIP), Proceedings of the IEEE, vol. 90, No. 9, 1495-1517 (Sep. 2002).
Carey, et al., "User Validation for Mobile Telephones," International Conference on Acoustics, Speech, and Signal Processing (ICASSP), vol. 2, Jun. 2000, pp. 1093-1096.
Chaudhari, et al., "Transformation enhanced multi-grained modeling for text-independent speaker recognition," International Conference on Spoken Language Processing, 2000, pp. 298-301.
Clavel, et al., "Events Detection for an Audio-Based Surveillance System," IEEE International Conference on Multimedia and Expo (ICME2005), Jul. 6-8, 2005, pp. 1306-1309.
Clifford J. Weinstein, MIT, The Experimental Integrated Switched Network—A System-Level Network Test Facility (IEEE 1983).
Coherent Announces Industry's First Remote Management System for Echo Chamber Canceller, Business Wire, Mar. 3, 1997.
Commander Call Control System, Rev. 1.04 (Science Dynamics 2002).
Defendant's Opening Claim Construction Brief, *Global Tel*Link Corporation v. Securus Technologies, Inc.*, Case No. 3:14-cv-0829-K (N.D. Tex.), filed Nov. 19, 2014.
Defendant's Responsive Claim Construction Brief, *Global Tel*Link Corporation v. Securus Technologies, Inc.*, Case No. 3:14-cv-0829-K (N.D. Tex.), filed Dec. 10, 2014.
Definition of "constant", The American Heritage Dictionary, 4th Ed. (2002); p. 306.
Definition of "telephony", McGraw-Hill Dictionary of Scientific and Technical Terms, 6th Edition (McGraw-Hill, 2003).
Definitions of "suspicion" and "suspect", American Heritage Dictionary, 4th Edition, New York: Houghton Mifflin, 2006; pp. 1743-1744.
Doddington, G., "Speaker Recognition based on Idiolectal Differences between Speakers," Seventh European Conference on Speech Communication and Technology, Sep. 3-7, 2001; pp. 2521-2524.
Dunn, et al., "Approaches to speaker detection and tracking in conversational speech," Digital Signal Processing, vol. 10, 2000; pp. 92-112.
Excerpts from International Telecommunication Union, "Technical Characteristics of Tones for the Telephone Service," ITU-T Recommendation E.180/Q.35, Mar. 9, 1998; 19 pages.
Excerpts from McGraw-Hill Dictionary of Scientific and Technical Terms, 5th Edition, 1994; pp. 680 and 1560.
Excerpts from the Prosecution History of U.S. Appl. No. 10/135,878, filed Apr. 29, 2002.
Excerpts from Webster's Third New International Dictionary, Merriam-Webster Inc., 2002, pp. 2367-2368.
File History of U.S. Pat. No. 7,899,167, U.S. Appl. No. 10/642,532, filed Aug. 15, 2003.
File History of U.S. Pat. No. 8,886,663, U.S. Appl. No. 12/284,450, filed Sep. 20, 2008.
Fraser et al., "Over-All Characteristics of a TASI System," The Bell System Technical Journal, Jul. 1962; pp. 1439-1454.
Furui, et al., "Experimental studies in a new automatic speaker verification system using telephone speech," Acoustics, Speech, and Signal Processing, IEEE International Conference on ICASSP '80, vol. 5, Apr. 1980, pp. 1060-1062.
Furui, S., "50 Years of Progress in Speech and Speaker Recognition Research," ECTI Transactions on Computer and Information Technology, vol. 1, No. 2, Nov. 2005, pp. 64-74.
Greene et al., "Media Gateway Control Protocol Architecture Requirements," Network Working Group, RFC 2805, Apr. 2000; 45 pages.
Hansen, et al., "Speaker recognition using phoneme-specific grams," The Speaker and Language Recognition Workshop, May-Jun. 2004.
IETF Mail Archive, Internet Archive Wayback Machine, Aug. 25, 2016, retrieved from https://mailarchive.ietf.org/archlsearchl?qRFC3389.
International Search Report and Written Opinion directed to International Patent Application No. PCT/US17/19723, dated Mar. 23, 2017; 8 pages.
Isobe, et al., "A new cohort normalization using local acoustic information for speaker verification," Proceedings of the IEEE International Conference on Acoustics, Speech, and Signal Processing, vol. 2, Mar. 1999; pp. 841-844.
Jeff Hewett and Lee Dryburgh, Signaling System No. 7 (SS7/C7): Protocol, Architecture, and Services (Networking Technology) at 85 (Cisco Press, Jun. 2005).
Johnston, et al., "Session Initiation Protocol Services Examples," Best Current Practice, RFC 5359, Oct. 2008, pp. 1-170.
Juang, et al., "Automatic Speech Recognition—A Brief History of the Technology Development," Oct. 8, 2014.
Kinnunen, et al., "Real-Time Speaker Identification and Verification," IEEE Transactions on Audio, Speech, and Language Processing, vol. 14, No. 1, Jan. 2006, pp. 277-288.
Knox, "The Problem of Gangs and Security Threat Groups (STG's) in American Prisons Today: Recent Research Findings From the 2004 Prison Gang Survey," National Gang Crime Research Center, 2005; 67 pages.
Maes, et al., "Conversational speech biometrics," E-Commerce Agents, Marketplace Solutions, Security Issues, and Supply and Demand, Springer-Verlang, London, UK, 2001, pp. 166-179.
Maes, et al., "Open SESAME! Speech, Password or Key to Secure Your Door?," Asian Conference on Computer Vision, Jan. 1998; pp. 1-3.
Matsui, et al., "Concatenated Phoneme Models for Text-Variable Speaker Recognition," International Conference on Acoustics, Speech, and Signal Processing (ICASSP), vol. 2, Apr. 1993; pp. 391-394.
Moattar, et al., "Speech Overlap Detection Using Spectral Features and its Application in Speech Indexing," Second International Conference on Information & Communication Technologies, 2006; 5 pages.
Navratil, et al., "A Speech Biometrics System with Multi-Grained Speaker Modeling," Proceedings of KOVENS 2000; 5 pages.
Navratil, et al., "Phonetic Speaker Recognition using Maximum-Likelihood Binary-Decision Tree Models," Proceedings of the IEEE International Conference on Acoustics, Speech, and Signal Processing, Apr. 6-10, 2003; 4 pages.
Original Specification as-filed Aug. 26, 2005, in U.S. Appl. No. 11/212,495 to Frost.
Original Specification as-filed Jul. 22, 2005, in U.S. Appl. No. 11/187,423 to Shaffer.
Osifchin, N., "A Telecommunications Buildings/Power Infrastructure in a New Era of Public Networking," IEEE 2000.
PacketCableTM 1.0 Architecture Framework Technical Report, PKT-TR-ARCH-V0 1-001201 (Cable Television Laboratories, Inc. 1999).

(56) References Cited

OTHER PUBLICATIONS

Pages from http://www.corp.att.com/history, archived by web.archive.org on Nov. 4, 2013.
Pelecanos, J. "Conversational biometrics," in Biometric Consortium Meeting, Baltimore, MD, Sep. 2006, accessible at http://www.biometries.org/bc2006/presentations/Thu_Sep_21/Session_I/Pelecanos_Conversational_Biometries.pdf.
Perkins, C., RTP Audio and Video for the Internet, Pearson Education, 2003.
Pfaffenberger, B., Webster's New World Dictionary of Computer Terms, Eighth Edition, 2000; p. 22.
Photocopy of "Bellcore Notes on the Networks (Formerly BOC Notes on the LEC Networks)," Bellcore, Special Report SR-2275, Issue 3, Dec. 1997.
Pollack, et al., "On the identification of Speakers by Voice," The Journal of the Acoustical Society of America, vol. 26, No. 3, May 1954.
Postel, J., "User Datagram Protocol," ISI, RFC 768, Aug. 28, 1980; 3 pages.
Proakis, John G., Digital Communications, Second Edition, McGraw-Hill, Inc. 1989; pp. 148-157.
Prosecution History of U.S. Appl. No. 10/910,566, filed Aug. 4, 2004.
Prosecution History of U.S. Appl. No. 11/480,258, filed Jun. 30, 2006.
Prosecution History of U.S. Appl. No. 12/002,507, filed Dec. 17, 2007.
Rey, R.F., ed., "Engineering and Operations in the Bell System," 2nd Edition, AT&T Bell Laboratories: Murray Hill, NJ, 1983.
Reynolds, D., "Automatic Speaker Recognition Using Gaussian Mixture Speaker Models," The Lincoln Laboratory Journal, vol. 8, No. 2, 1995; pp. 173-192.
Rosenberg et al., "SIP: Session initiation Protocol," Network Working Group, Standards Track, RFC 3261, Jun. 2002, 269 pages.
Rosenberg, et al., "The Use of Cohort Normalized Scores for Speaker Verification," Speech Research Department, AT&T Bell Laboratories, 2nd International Conference on Spoken Language Processing, Banff, Alberta, Canada, Oct. 12-16, 1992.
Ross, et al., "Multimodal Biometrics: An Overview," Proc. of 12th European Signal Processing Conference (EUSIPCO), Vienna, Austria, Sep. 2004, pp. 1221-1224.
Russell, T., Signaling System #7, Fourth Edition, McGraw-Hill, 2002; 532 pages.
Schulzrinne et al., "RTP: A Transport Protocol for Real-Time Applications," Network Working Group, RFC 3550, Jul. 2003; 89 pages.
Science Dynamics, Inmate Telephone Control Systems, http://scidyn.com/fraudprev_main.htm (archived by web.archive.org on Jan. 12, 2001).
Science Dynamics, SciDyn BubbleLINK, http://www.scidyn.com/products/bubble.html (archived by web.archive.org on Jun. 18, 2006).
Science Dynamics, SciDyn Call Control Solutions: Commander II, http://www.scidyn.com/products/commander2.html (archived by web.archive.org on Jun. 18, 2006).
Science Dynamics, SciDyn IP Gateways, http://scidyn.com/products/ipgateways.html (archived by web.archive.org on Aug. 15, 2001).
Science Dynamics, Science Dynamics—IP Telephony, http://www.scidyn.com/iptelephony_maim.htm (archived by web.archive.org on Oct. 12, 2000).
Shearme, et al., "An Experiment Concerning the Recognition of Voices," Language and Speech, vol. 2, No. 3, Jul./Sep. 1959.
U.S. Appl. No. 60/607,447, "IP-based telephony system and method," to Apple, et al., filed Sep. 3, 2004.
Viswanathan, et al., "Multimedia Document Retrieval using Speech and Speaker Recognition," International Journal on Document Analysis and Recognition, Jun. 2000, vol. 2; pp. 1-24.
Weisstein, Eric W., "Average Power," MathWorld—A Wolfram Web Resource, 1999, retrieved from http://mathworld.wolfram.com/AveragePower.html.
Wozencraft et al., Principles of Communication Engineering, 1965; pp. 233-245.
Zajic, et al., "A Cohort Methods for Score Normalization in Speaker Verification Systme, Acceleration of On-Line Cohort Methods," Proceedings of the 12th International Conference "Speech and Computer," Oct. 15-18, 2007; 6 pages.
Zopf, R. "Real-time Transport Protocol (RTP) Payload for Comfort Noise," Network Working Group RFC 3389, Sep. 2002; 8 pages.

\* cited by examiner

SYSTEM AND METHOD FOR DETECTING THREE-WAY CALL CIRCUMVENTION ATTEMPTS

CROSS-REFERENCE TO RELATED APPLICATION

This is a continuation application of U.S. patent application Ser. No. 13/958,137, filed Aug. 2, 2013, which is a continuation-in-part application of U.S. patent application Ser. No. 12/378,244, filed Feb. 12, 2009, now U.S. Pat. No. 8,630,726, issued Jan. 14, 2014, which are incorporated herein by reference in their entirety.

FIELD OF THE INVENTION

The present invention relates generally to the field of detecting three-way call attempts in controlled telecommunications systems. In particular, the present invention relates to a system and method for preventing a user from successfully circumventing or masking a three-way call attempt by generating a continuous or constant noise. The system and method of the present invention may be utilized with any existing three-way call detection system or method. The present invention preferably monitors for periods of silence and whether the examined samples are below a pre-determined threshold. If the pre-determined threshold is exceeded, the present invention determines that an attempt to circumvent a three-way call has occurred if the amount of time between periods of silence exceeds the maximum allowable duration for continuous audio. The system also includes a continuous noise detection algorithm for detecting the presence of false positives in the audio steam.

BACKGROUND OF THE INVENTION

Many institutions, such as prisons, nursing homes, mental institutions, etc., include controlled telecommunications systems that offer inmates or residents limited calling access. One reason for controlling use of the system is to prevent the institution from incurring unaccountable telephone costs. Other reasons for controlling access to the system include preventing harassing calls to outside parties, preventing fraudulent activities, etc. Therefore, systems in such environments often monitor and control the telephone activity of each inmate or resident. For example, systems may restrict calling to only certain telephone numbers. Systems may also have a means of maintaining call records for each inmate or resident, and a means for communicating with called parties to enable the called parties to prevent future telephone calls from inmates or residents. In short, the communications system used in a regulated institution must employ unique monitoring and control functions often unnecessary in other types of telecommunications systems.

In order for the methods of monitoring and control to be effective, it is important to prevent inmates or residents from exploiting any loopholes that can be used to bypass the control features of the system. For example, inmates or residents have been known to use three-way calling to have an outside party connect the inmate or resident to a blocked number. A three-way call is initiated when the remote called party depresses the hook switch on the telephone, generating a hook flash signal. The caller is temporarily put on hold while the called party establishes a connection with a third party. Then, all three parties can converse. Using three-way calling, the inmate or resident may utilize the institution's call system to, among other things, access blocked telephone numbers, for example, to perpetrate additional criminal activities, or harass certain parties.

It is therefore critical to carefully monitor all outgoing telephone calls for three-way call attempts. Without such monitoring, many of the system's control features of a telecommunications system can be rendered ineffective. Currently, there are systems and methods known in the art for detecting three-way call attempts. Many of these systems however, are inaccurate and subject to both false positives and false negatives. Also, many of these systems are effective only in certain types of telecommunications systems.

For example, one such system known in the art for detecting three-way call attempts monitors for pulses of energy indicative of a hook-flash by detecting the frequency of the energy pulse to determine if it is characteristic of a hook-flash (i.e., a three-way call attempt). Specifically, the system includes a low pass filter for passing energy signals having frequencies below 500 Hertz ("Hz"), preferably in the range of 100 to 300 Hz, and an energy detector for detecting specific electrical energy pulses passing through the filter and having a predetermined minimum magnitude. The system also includes a software window analyzer, which cooperates with the energy detector to detect specific events, such as sound, occurring on the telephone line during a predetermined time window after the detection of the aforementioned energy pulse. The software window analyzer includes a timer means that is activated by the detection of the energy pulse, and a sound means for detecting the occurrence of sound on the telephone line during at least one of multiple windows of time defined by the timer means. The non-occurrence of sound on the telephone line during a specified time window is used by the system to confirm that the detected energy pulse is in fact a three-way call attempt. A counter means is further implemented for counting specific energy pulses detected by the energy detector during the time window when the remote party is using a pulse-dial telephone. This system, by simply monitoring for a pulse composed of certain frequencies, is often inaccurate and cannot operate in digital systems.

A similar system is also designed to detect the presence of an energy pulse indicative of a hook-flash. Specifically, the system is designed to detect a pulse that is comprised of frequency components below 500 Hz and above a predetermined threshold. The existence of the hook-flash is confirmed by digital signal processing equipment which identifies a rapid drop-off in energy, which is indicative of a hook-flash signal. Optionally, the hook-flash may be further confirmed by including software for cooperating with the energy detector to ascertain whether sound has occurred in the telecommunication during a predetermined period following the first hook-flash signal.

Still another known system includes three-way call detection circuit that uses digital signal processing to identify a third party connection. The system operates by establishing a baseline background noise. The system identifies a drop in noise level below the established baseline background noise as an indication that a three-way conference call has been attempted by the called and/or calling party.

Yet another known system monitors all connected telephone lines for indicia representative of a three-way call attempt. For example, the system may monitor for a digital PCM signal or a period of silence, followed by a release pulse, followed by yet another period of silence. Upon detection of a possible three-way call attempt, the three-way call detection circuit examines the digital signals to determine the spectral characteristics (i.e., time duration, frequency, and energy level) of a suspected release pulse of the suspected three-way call attempt. The system utilizes pattern recognition techniques to compare the suspected release pulse with a reference release pulse indicative of a three-way call attempt. The system also monitors for periods of silence before and after the suspected release pulse. If the system finds that the suspected release pulse is substantially similar to the reference release pulse and that the correct periods of silence surrounding the suspected release pulse are present, the system responds to the detection, for example, by disconnecting the telephone call, playing a recording, or creating a record of the three-way call attempt.

Yet another known system for detecting three-way calls monitors audio signals for features that distinguish voice and line-generated audio signals from audio signals produced by events associated with three-way call attempts. The distinguishing features used are pulse patterns that are strongly correlated with either audio signals generated by central office switching activity ('clicks') (reference features) or voice-generated audio signals (reset features). Audio signals are continuously monitored for reference and reset features over selected intervals or sampling windows. Sampling windows are reset whenever reset features are detected in the associated audio signal segment. Audio signals that are free of reset features and include reference features are tagged as potential click events. A three-way call event is declared when audio signals associated with consecutive sample windows are tagged as potential three-way call events. In this system, a control program samples the audio signal at the selected rate and sorts the sampled signals during a sampling window to produce a profile of the sampled audio signal. The profile comprises counters for tracking the number, strength (loudness), and separation of signal pulses. These counters may be compared in various combinations with counter values extracted from voice-generated audio signals (reset thresholds) and three-way call generated audio signals (reference thresholds) to declare a three-way call attempt, continue sampling, or reset the sampling window.

Another known system counts signal characteristics to detect three-way call attempts. The system samples audio from a telephone conversation, sorts the sampled signals into a profile of levels for the sampled audio signals, and monitors the profile of sampled audio signals for reset and reference conditions. In this system, a reset condition is a pulse pattern inconsistent with patterns generated by three-way call events. Reference conditions, in contrast, are pulse patterns identified from sampled audio signals that are consistent with patterns generated by three-way call events. If a reference condition is detected, the telephone call is tagged as having a possible three-way call attempt. The system concludes that a three-way call attempt has occurred when two consecutive tags have been made to the same telephone call.

Still another known system detects three-way calls by recognizing that each telephone connection has a characteristic reflection, or echo, idiosyncratic to that connection. The echo characteristics of a particular telephone connection are altered, for example, when a three-way calling feature is activated by the remote party at the original destination thereby adding a third party at a secondary destination. The system includes means for "zeroing out" or canceling the characteristic echo once a connection has been established by using an adaptive finite impulse response (FIR) filter. The system also includes response means for implementing a predetermined response when an undesirable event is detected. Examples of the responses which can be pre-programmed include call termination, playing a prerecorded message, generating a tone which may be heard by one or more parties to the call, muting the microphone of the local telephone and recording the date and time of the remote party's attempt to initiate the three-way call.

Other systems are known which incorporate methods of monitoring calls in telecommunications management systems. For example, the methods include means for detecting tones commonly associated with call bridging and call forwarding attempts. One such method is directed to the detection of tones such as ring signals, busy signals, special information tones ("SIT tones"), dual tone multi-frequency tones ("DTMF"), call progress tones or other similar tones characteristic of the placement of a telephone call.

Yet another known system incorporates spread spectrum techniques to detect three-way calls. The system measures delay times associated with multiple echoes of a reference signal transmitted over a two-way call. This initial echo characteristic is measured and recorded in an initial echo profile. Whether a three-way calling event has occurred is determined by virtue of changes in the delay times and number of echoes in each subsequent echo profile when compared with the initial echo profile. In view of the foregoing, a need clearly exists for a method and system of three-way call detection capable of accurately detecting three-way call attempts in analog and digital telecommunications systems. This method and system may be used in conjunction with any current system, but is preferably implemented within a system that detects three-way call attempts by analyzing the communications path between the originator and recipient in a telecommunications network.

SUMMARY OF THE INVENTION

The present invention embodies a three-way call detection circuit for use with an existing telephone management system, and is designed to reduce the number of three-way call attempts not detected by current three-way call detection techniques. The system of the present invention may be implemented in a variety of facilities including, but not limited to, penal institutions, mental institutions, nursing homes, rehabilitation centers, correctional facilities, government agencies, private and public business and the like.

Typically, a telephone management system used by such facilities consists of a multitude of telephones connected to a switchboard device. The switchboard device routes calls, performs voice prompts and responds to menu selections. Telephone calls placed by users of the telephone management system are routed through the switchboard device and connected to the proper outgoing trunk based on the type of call placed (e.g., collect, debit, etc.). An integrated cross point switch enables any telephone to access any available outgoing trunk.

The three-way call detection circuit of the present invention is utilized each time a telephone call is placed by a user of the telephone management system. The circuit constantly monitors all active trunk lines and telephone conversations. During a telephone call, the three-way call detection circuit monitors the connection for pulses of energy associated with the act of the called party initiating a three-way call. The system of the present invention monitors the presence of audio signals generated by the central office switching activity (hereinafter, "clicks") indicative of a three-way call initiation attempt.

For a called party to initiate a three-way call, the called party typically depresses the hook-switch momentarily to put the calling party on hold and to call a third-party. The called party's depression of the hook-switch generates a hook-flash signal, which results in the central office generating a click on the inmate's telephone line. It has been shown that in certain instances a user can circumvent current three-way call detection systems by "covering up," "masking," or otherwise hiding a three-way call attempt by creating a constant or continuous noise (e.g., a constant hum or a constant hiss) while the three-way call is being attempted. Prior art systems are not designed to nor are they capable of detecting such a continuous noise. Thus, users of prior art systems can bypass the system simply creating continuous noise during a three-way call attempt.

The present invention provides for a method to detect circumvention attempts during a three-way call attempt. Specifically, during each call, the system monitors for periods of silence (e.g., by examining a number of samples from an audio stream to determine whether the sample is below a certain, pre-determined threshold). When the system preferably detects that the samples are below the pre-determined threshold, it continues to monitor the audio samples until the pre-determined threshold is exceeded. After the pre-determined threshold is reached, the system continues to examine the audio stream for the next period of silence. The system then determines the amount of time between the periods of silence to determine whether it exceeds the maximum allowable duration for continuous audio. If the elapsed time is greater than a pre-determined maximum duration, the system determines that an attempt to circumvent the three-way call system has occurred and appropriate action is taken.

As a further check to avoid potential false positives, the present invention provides a system and method to monitor signal power of the samples during the period when the pre-determined threshold is exceeded. A false positive occurs when the signal power is not evenly distributed across the period during which the pre-determined threshold is above the maximum allowed.

Therefore, it is an object of the present invention to provide a three-way call detection method and system for detecting three-way call circumvention attempts.

It is another object of the present invention to monitor the signal power of the audio signal for detecting three-way call circumvention attempts.

Furthermore, it is an object of the invention to accurately detect three-way call attempts and respond with a designated action (e.g., disconnect, flag, record, monitor, etc.).

It is another object of the invention to provide a three-way call detection method and circuit which stores all detected three-way call attempts in a central database.

It is still a further object of the invention to provide a three-way call detection method and circuit capable of monitoring a telephone conversation from the called party's side of the connection.

Additionally, it is an object of the invention to provide a three-way call detection method and circuit which is compatible with pre-existing telephone management systems.

Finally, it is a further object of the invention to provide a three-way call detection method and circuit compatible with both analog and digital telecommunications systems.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENT

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Figure 1:
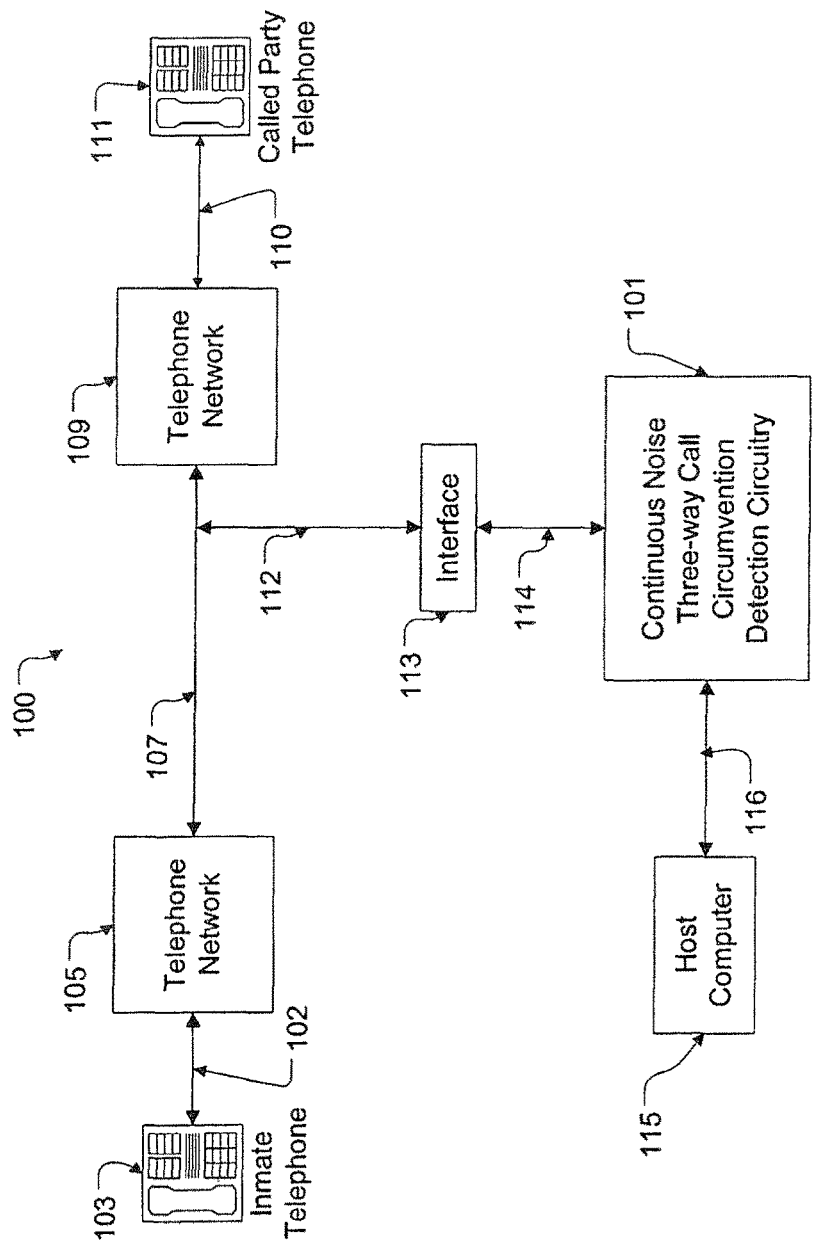
FIG. 1 shows a block diagram of the preferred configuration of the three-way call detection system including continuous noise detection of the present invention.

Referring to FIG. 1, there is shown a Continuous Noise three-way call detection circuit 101 (hereinafter called "three-way call detection circuit 101") of the present invention configured to monitor telephone calls between an inmate or resident (calling from inmate telephone 103) and a called party (from called party telephone 111) in telecommunications system 100. Particularly, three-way call detection circuit 101 is provided to monitor audio between inmate telephone 103 and called party telephone 111 and detect a three-way call attempt including a three-way call circumvention attempts. In this configuration, inmate telephone 103 connects to telephone network 105 through connection 102, and called party telephone 111 connects to telephone network 109 through connection 110. Telephone network 105 and telephone network 109 bi-directionally communicate audio data through connection 107 thus enabling an inmate or resident at inmate telephone 103 to communicate with a called party at called party telephone 111.

Three-way call detection circuit 101 monitors connection 107 through interface 113. Specifically, interface 113 receives audio signals from connection 107 through monitor connection 112. In turn, interface 113 provides the signals to three-way call detection circuit 101 through interface connection 114. Alternatively, three-way call detection circuit 101 can receive data directly from connection 107.

In an alternative configuration, three-way call detection circuit 101 can monitor connection 102 between inmate telephone 103 and telephone network 105. If, for example, inmate telephone 103 is in an institution such as a prison, nursing home, school, detention center, hospital, etc., this enables three-way call detection circuit 101 to be internal to the institution. Three-way call detection circuit 101 is compatible with institutional telecommunications systems such as those in prisons, nursing homes, mental institutions, etc. Therefore, host computer 115 may be any computer in a telecommunications system, including a host computer in one of the institutions listed above. In these types of institutions, it is important to monitor all telephone calls for the presence of three-way call attempts to prevent, among other things, inmates or residents from accessing blocked or restricted telephone numbers.

Three-way call detection circuit 101 (which will be discussed in more detail below with respect to FIG. 2) monitors connection 107 or alternatively, connection 102, for signals indicative of a three-way call attempt. Three-way call detection circuit 101 also communicates with host computer 115 via host connection 116 to inform host computer 115 if a three-way call attempt was initiated by a called party at called party telephone 111. As discussed earlier, a three-way call is typically initiated when the called party depresses the hook switch on the telephone, generating a hook-flash signal. The calling party (i.e., the inmate or resident) is temporarily disconnected from the called party while the called party establishes a connection with a third party. Then, all three parties can converse. Preferably, three way-call detection circuit 101 monitors connections 107 and 102 for continuous noise which is indicative of a three-way call circumvention or masking attempt. If three-way call detection circuit 101 detects either a three-way call attempt or three-way call circumvention or masking attempt, it communicates this to host computer 115. Host computer 115 can then use this information to take the appropriate action, which may include disconnecting the telephone call, warning the calling or the called party, monitoring the call, logging the call, flagging the call, etc.

Figure 2:
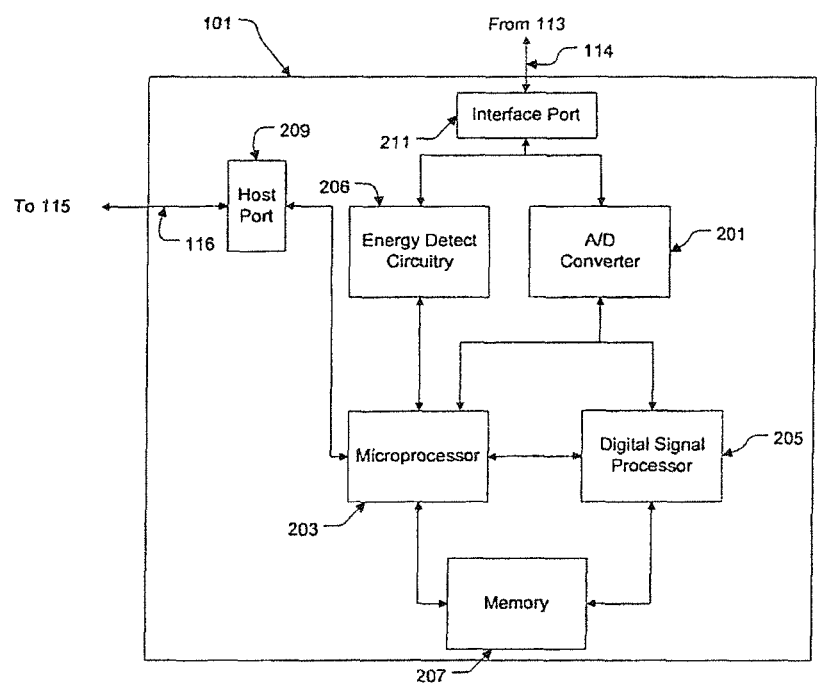
FIG. 2 depicts a schematic representation of the preferred embodiment of the three-way call detection circuit shown in FIG. 1 illustrating its ports and internal structure.

Turning next to FIG. 2, depicted is a block diagram of an embodiment of three-way call detection circuit 101. As shown, three-way call detection circuit includes analog to digital (A/D) converter 201, microprocessor 203, digital signal processor 205, energy detection circuit 206, memory 207, host port 209, and interface port 211.

During operation, three-way call detection circuit 101 monitors the telephone line communication between an inmate or resident and a called party by receiving audio data from interface 113 through connection 114 (see FIG. 1). The system of the present invention is preferably compatible with both analog and digital telecommunications systems.

Therefore, signals received by three-way call detection circuit 101 from interface 113 may be either analog or digital. If the signals are analog, A/D converter 201 first converts the signals to a digital format before being sent to microprocessor 203 and digital signal processor 205. If the telecommunications system is digital, a D/A converter may be used to transmit analog signals to energy detection circuit 206. Notably, three-way call detection circuit 101 is compatible with a signal represented by 8-bit signed linear data, 8-bit µ-law, 16-bit linear data, etc. It should be appreciated that three-way call detection circuit 101 monitors connection 107 for inmate or resident data as well as called party audio data in order to perform three-way call detection.

Signals from connection 114 are received at interface port 211 and transmitted to both A/D converter 201 and energy detection circuit 206. A/D converter 201 converts analog telephone line data to a digital signal compatible with microprocessor 203 and digital signal processor 205. As will be discussed with respect to FIG. 3, microprocessor 203 instructs digital signal processor 205 and energy detection circuit 206 to analyze the signal received from the telephone connection. Microprocessor 203 uses this analysis to detect signals from the telephone line indicative of a three-way call using the algorithm to be discussed below. If a three-way call circumvention attempt is detected, microprocessor 203 informs host computer 115 by transmitting a message to host port 209. Host port 209, in turn, communicates this message through connection 116 to host computer 115.

Figure 3:
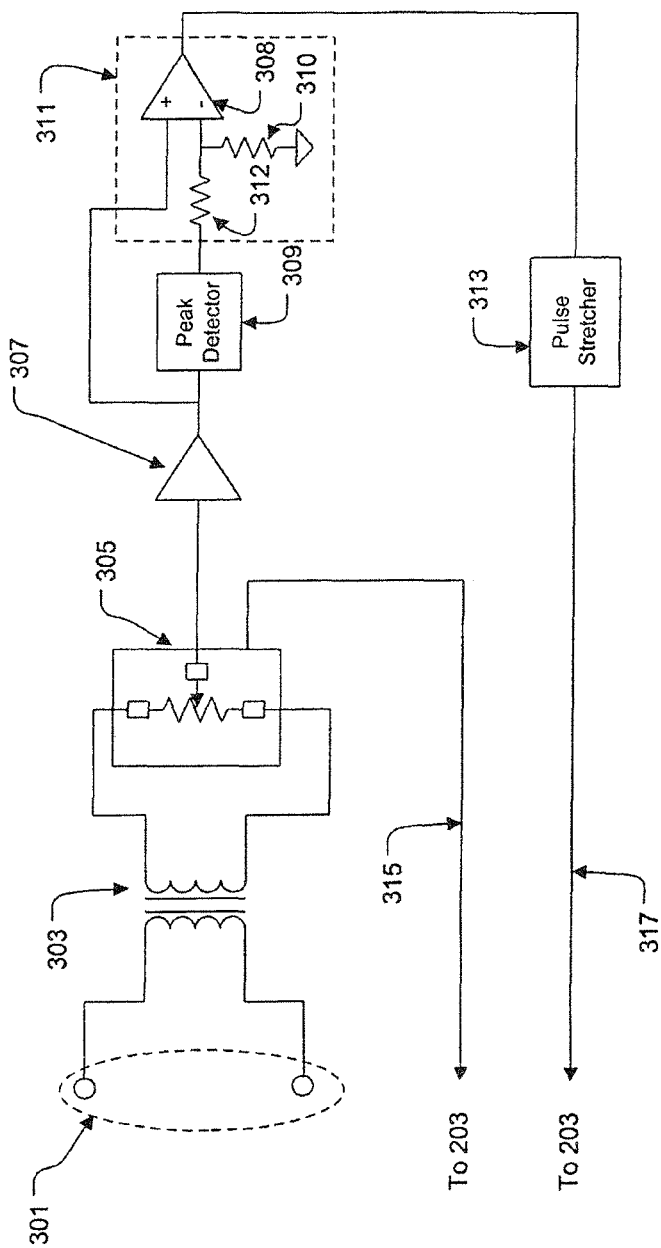
FIG. 3 is a schematic diagram of an embodiment of the circuit used to detect energy pulses having amplitudes and durations characteristic of a three-way call click.

Referring next to FIG. 3 shown is a block diagram of energy detection circuit 206 used by three-way call detection circuit 101 to detect an energy pulse utilizing a threshold detector 311 and pulse stretcher 313. As shown, energy detection circuit 206 preferably comprises audio input 301, isolation transformer 303, sensitivity adjustment circuit 305, amplifier 307, peak detector 309, threshold detector 311, and pulse stretcher 313. Of course, other known circuits for detecting energy may be used, as necessary. In the preferred embodiment, isolation transformer 303 is used to isolate energy detection circuit 206 from the circuit of the inmate's or resident's telephone handset while transferring the handset signals from audio input 301 to energy detection circuit 206. This transferred signal is then adjusted by sensitivity adjustment circuit 305 under control of microprocessor 203 via sensitivity adjustment line 315. The conditioned signal is then amplified by amplifier 307.

Peak detector 309 isolates energy pulses in the filtered signal that exceed a predetermined magnitude. In one embodiment, the predetermined magnitude is approximately 6 Decibels (dB), although other magnitudes may be chosen in accordance with the invention. When such a pulse is detected, the output of peak detector 309 is driven high and a signal is sent to threshold detector 311, which is comprised of operational amplifier 308, and resistors 310 and 312. Preferably, resistors 310 and 312 are both 10 kΩ resistors. If a pulse is provided to threshold detector 311, it passes the signal to pulse stretcher 313. If no pulse is detected, threshold detector 311 does not output the received signal.

Preferably, pulse stretcher 313 is used to maintain the output of threshold detector 311 at its high level for 20 milliseconds. However, pulse stretcher 313 may be configured to maintain the output of threshold detector 311 for any time period. The stretched signal is then output on energy detect line 317 and analyzed by microprocessor 203 to determine if an energy pulse consistent with a three-way call click has been found (i.e., if the pulse has a magnitude of approximately 6 dBs or greater).

In one embodiment, three-way call detection circuit 101 detects continuous noise (i.e., power levels in a continuous noise audio stream) generated by a user in an attempt to circumvent three-way call detection. As such, the three-way call detection circuit 101 examines the audio data from the calling party as well as the called party to identify an initial period of silence followed by continuous noise and a second period of silence (also called 'three-way' event). The three-way call detection circuit 101 includes a digital signal processor 205 comprising a "continuous noise detection" algorithm (or CND Algorithm) for identifying areas in the audio stream where the signal level is continuously above a certain threshold. However, the CND algorithm may identify some parts of the audio stream as three-way events (i.e., silence, noise followed by silence), where no three-way event had been attempted. These events are characterized as 'false positive' and the CND Algorithm includes a Power Distribution Filter (PDF) Algorithm as well as a Zero Crossing Filter (ZCRF) Algorithm to identify these false positives. These Algorithms will be described in detail below.

Figure 4:
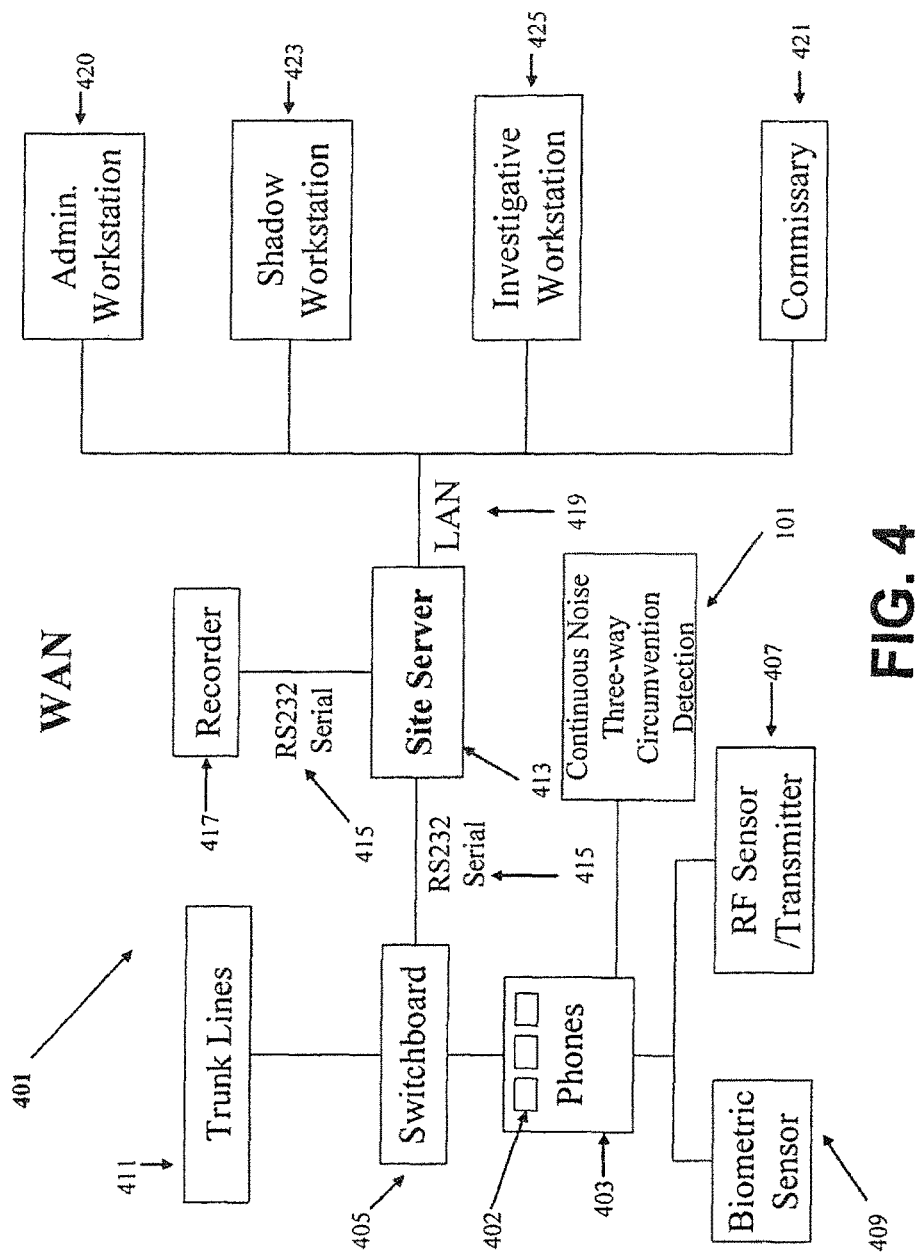
FIG. 4 shows a block diagram of an alternate configuration of the three-way call detection system of the present invention.

Referring next to FIG. 4, shown is an alternate configuration of the three-way call detection circuit 101 as used in an institution telephone management system 401. A plurality of user telephones 402, wherein the actual number of telephones depends on the desired capacity of the institution call system, are incorporated into a telephone bank 403 and are connected to an electronic switchboard device 405. It is preferred that telephone bank 403 may be centrally located within a facility to allow for centralized monitoring. However, it is foreseeable that telephone bank 403 may be located at a multitude of locations internal or external to a facility to allow for efficient monitoring. Each user telephone 402 may be equipped with biometric sensing device 409, such as a retinal scanner, fingerprint reader, etc., or any combination of biometric devices, so that the acquired biometric data can be used for user authentication. Alternatively, for efficiency, a single biometric sensing device 409 may be employed for a multitude of user telephones 402. Additionally, each telephone may incorporate RF receiver 407 and RF transmitter 408 to provide RF signals for authentication purposes. In this scenario, it is foreseeable that each user is be required to wear an RF transmitter 408 device to transmit radio waves to the RF receiver 407. RF receiver 407 may be integral to telephone bank 403 or remote to telephone bank 403. Each RF transmitter 408 may be uniquely encoded to a specific authorized user. The encoded signal for RF transmitter 408 may be altered on an intermittent basis depending on the security desired at the institution. RF transmitter 408 may be incorporated into a wristband, ankle band, or any other like device. It is foreseeable that RF transmitter 408 may be semi-permanently or permanently attached to a user's person in any manner.

Electronic switchboard device 405 regulates calls and connects them to the proper outgoing trunk line 411. Trunk line 411 may consist of a multitude of connections to any number of local, long distance, or international telephone service providers. The number of trunk lines 411 depends on the outgoing capacity desired by the institution. In addition, trunk lines 411 may be analog, digital, or any other type of trunk lines not yet contemplated. Electronic switchboard device 405 further incorporates an integrated channel bank, allowing calls to be processed over either analog or digital trunks as required by the telephone call system 401. Specifically, when one trunk line 411 is occupied and handling an outgoing communication, electronic switchboard device 405 automatically accesses an alternate trunk line 411 to handle the outgoing communication. If all trunk lines 411 on the system are in use, the call may be routed to an alternate system (not depicted). For example, electronic switchboard device 405 may be interconnected to a multitude of switchboards to allow for expansion of the system to meet the capacity desired by the institution. A cross point switch integrated into electronic switchboard device 405 may also accomplish this routing.

Multiple processors may also be incorporated into the architecture. This allows call processing even after parallel component failure. The architecture also provides for a sharing of the load between processors, which eliminates system overload during extremely busy periods. The multiple processors enable the system to handle large volumes of calls at any time, and ensure system integration.

Additionally, electronic switchboard device 405 performs the voice prompts heard by the calling party and the recipient of the call allowing the parties to respond to the menu selections. Electronic switchboard device 405 tests outgoing trunk lines as calls are placed and digitizes telephone audio for recording and/or biometric voice identification purposes. If no dial tone is present, one of trunk lines 411 may be taken out of service for a pre-programmed amount of time for maintenance. These capabilities are pre-programmed into the device's firmware. However, it is foreseeable that software and software upgrades may provide these services in addition to other services useful in the present invention.

A central site server 413 interfaces within the telephone call system 401 via a first serial port 415. In the preferred embodiment of the present invention, an RS-232 serial port is employed for the interference connection. However, it is foreseeable that other types of serial ports 415 commonly known in the art may be utilized. Serial port 415 may also be comprised of a direct hardware connection or may consist of a series of ports and connecting means commonly known in the art for connecting electronic devices. Serial port 415 is designed to allow firmware driven systems, such as electronic switchboard device 405, to interface with software-based systems, such as a PC designed system operating as a site server. All inmate and call information is routed through central site server 413. At central site server 413, user call information is digitized for efficient data transfer and efficient record keeping. Central site server 413 stores at least each user's financial transaction data. It is preferred that central site server 413 also stores the digitized audio used for voice prompts as well as each user's call restrictions, PIN, biometric verification data, etc. However, depending on the memory requirements, numerous site servers may be employed. It is foreseeable that older archived data may also be stored on an integral or a remote computer system database (not shown) or kept on additional storage devices on the central site server 413.

Three-way call detection circuit 101 is utilized each time a telephone call is placed utilizing telephone call system 401. Three-way call detection circuit 101 is connected to telephone bank 403 and constantly monitors all active trunk lines 411 and telephone conversations. During a telephone call, three-way call detection circuit 101 monitors the connection and looks for three-way call circumvention or masking attempts.

Figure 5:
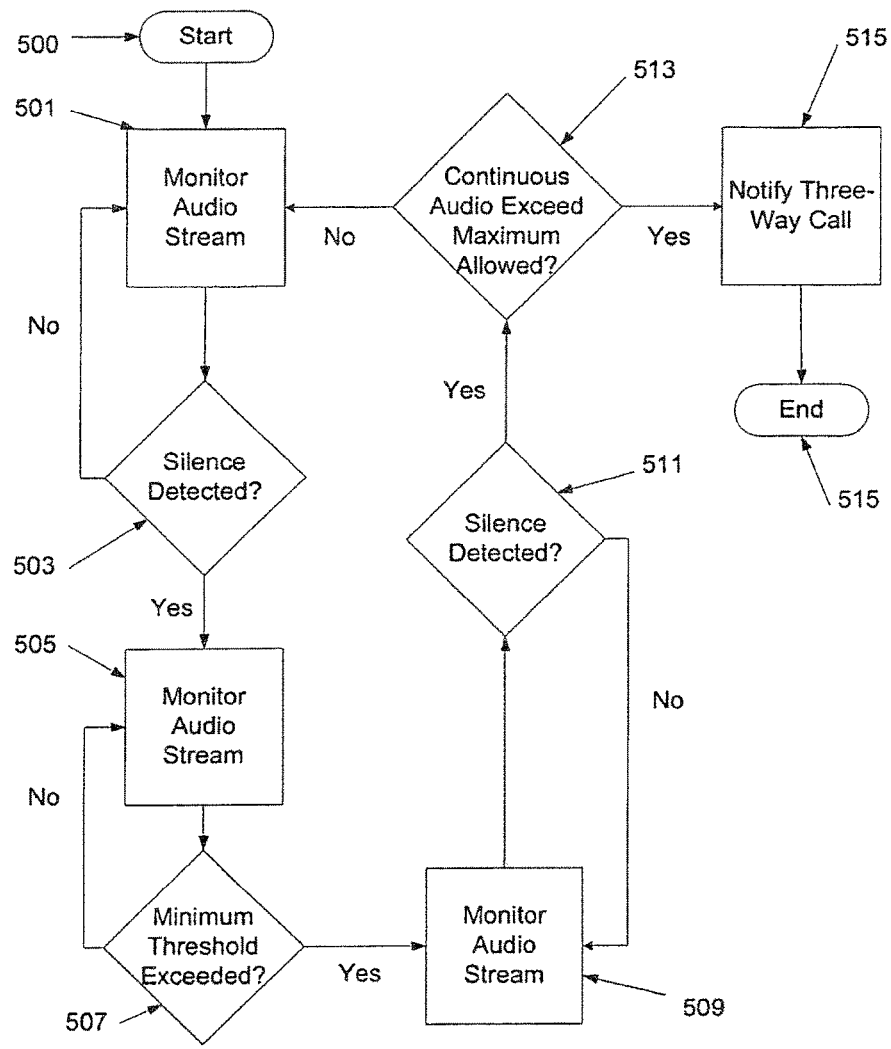
FIG. 5 depicts a flow chart of a preferred process implementing the present invention to detect attempts to circumvent a three-way call detection system and method by generating a continuous noise during the three-way call attempt.

Referring now to FIG. 5, there is shown a method for detecting continuous noise, which is implemented within the three-way call detection circuit 101 of the telecommunication system 100 in the preferred embodiment of the invention. Particularly, and as shown in FIG. 5, the flow chart describes the method to implement a continuous noise detector or detection circuit utilized to detect continuous noise, which is likely indicative of an attempt to mask or otherwise cover up a three-way call attempt. Importantly, one of skill in the art will readily appreciate that the continuous noise detector may be used along or implemented in or with any three-way call detection system and method, and is shown incorporated into the above system and method by way of example only. Moreover, although the process is shown within a digital system, it may also be implemented in an analog system. It should also be appreciated that the system 100 may be configured for a silence event when the power level of the audio signal is below a pre-determined threshold, such as in one non-limiting embodiment −20 decibels (dBm). Also, other configuration parameters are maximum allowable length of continuous audio (i.e. Maximum allowable time period for continuous noise not to exceed 1500 ms, sample size of 512 bytes and bit rate of data at 8 KHz although, in other non-limiting embodiments, three-way call detection system 100 may be configured with other parameters.

The process begins with step 500 and is followed by step 501 whereby the audio streams of both parties on the call are monitored. Preferably, the process examines a pre-determined sample size of the audio streams, such as in one non-limiting example, a sample size of 512 bytes, to determine whether the audio of the sample is below a pre-determined threshold (e.g., −20 dBm) (step 503). The process continues to loop until a sample falls below the pre-determined threshold (as shown in the loops of steps 501 and 503), and this event signifies a silence event. If the predetermined threshold is not met (i.e., the amplitude of the sample is less than the pre-determined threshold), the process continues to monitor the streams until the audio stream exceeds the pre-determined threshold (as shown in the loop of steps 505 and 507).

Once the pre-determined threshold is reached, the process starts a timer (T1) and continues to monitor the stream until the audio stream again falls below the pre-determined threshold (as shown in the loop of steps 509 and 511). Upon detection of the audio stream falling back below the pre-determined threshold, the process stops the timer (T2) and compares the elapsed time (T2-T1) to a pre-determined acceptable duration (step 513). In one non-limiting example, the pre-determined acceptable duration is set to a maximum allowable length of continuous audio not exceeding 1500 ms (milliseconds). If the elapsed time (T2-T1) is greater than the acceptable duration, the system determines that an attempt to circumvent the three-way call system has occurred and appropriate action is taken (step 515). If the elapsed time (T2-T1) is less than the acceptable duration, the process starts over (step 501) for the remaining duration of the call.

Figure 6:
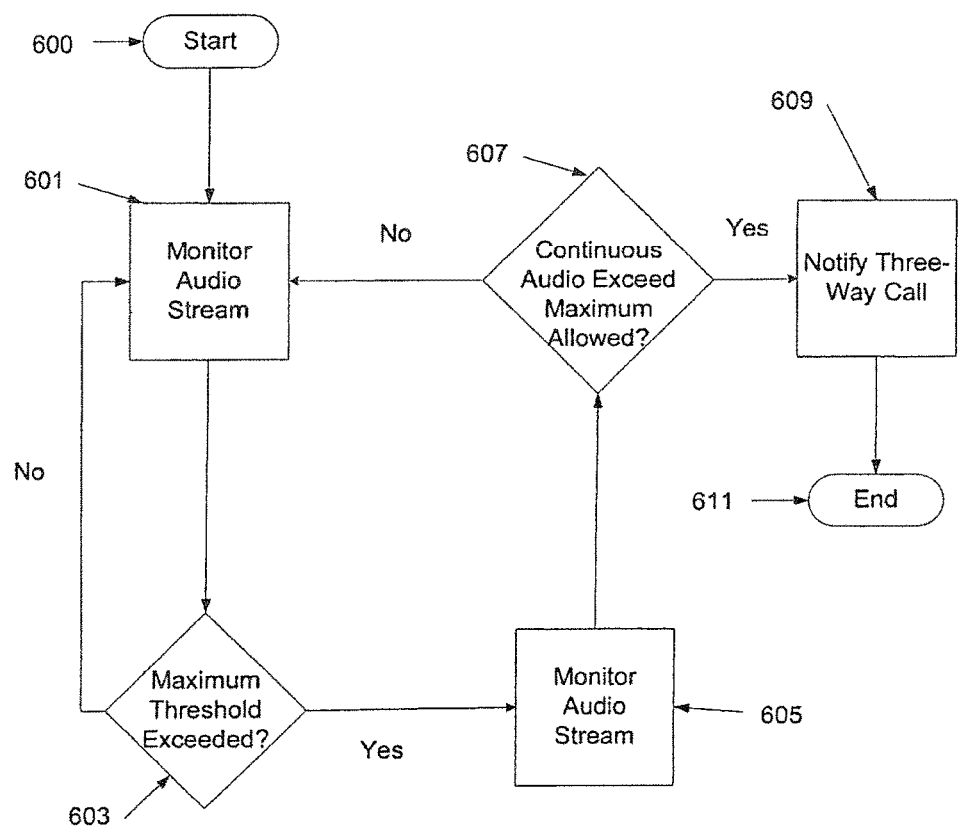
FIG. 6 depicts a flow chart of an alternative process implementing the present invention to detect attempts to circumvent a three-way call detection system and method by generating a continuous noise during the three-way call attempt.

In another alternate embodiment as shown in FIG. 6, instead of monitoring for when a sample falls below a pre-determined threshold, the process may monitor for sample having a power level above a pre-determined threshold. In this way, the timer will begin when the pre-determined threshold is reached (regardless of whether it is preceded by the sample falling below a pre-determined minimum threshold) and continue for a set period of time (T). If the sample remains above the pre-determined threshold for the entire period T, the system determines that an attempt to circumvent the three-way call system has occurred and appropriate action is taken. If not, the system continues to monitor the call for events indicative of attempts to circumvent the system's three-way call detection method.

The method starts in step 600 and is followed by step 601 (step 601) whereby the audio streams of both parties on the call are monitored. Preferably, the process examines a pre-determined sample size of the audio streams, such as in one non-limiting example, a sample size of 512 bytes to determine whether the audio of the sample is above a pre-determined threshold (e.g., −20 dBm). If the sample does not rise above the predetermined threshold, the circuit 101 continues to loop (as shown in the loop of steps 601 and 603). When a maximum threshold is reached in step 603, the method proceeds to step 605 where circuit 101 starts a timer which continues for a set period of time (T). Step 605 is followed by step 607 and in this step, if the sample remains above the pre-determined threshold for the entire period T, the system 101 determines that an attempt to mask a three-way call attempt has occurred and appropriate action is taken in step 609. If the circuit 101 determines that the sample fell below the pre-determined threshold, preferably for at least a period P during period T (where T>P), the system determines that no three-way call circumvention attempt has occurred and continues to monitor for events indicative of an attempt to mask a three-way call attempt (step 601).

Using a similar method, a three-way call can be detected based on the continuous noise of a ringer during the original call. For example, the method starts in step 600 and is followed by step 601 (step 601) whereby the audio streams of both parties on the call are monitored. Preferably, the process examines a pre-determined sample size of the audio streams, such as in one non-limiting example, a sample size of 512 bytes to determine whether the audio of the sample is above a pre-determined threshold. In this embodiment, the pre-determined threshold should be set so as to detect a hook-flash signal. In an embodiment, the threshold detector can be substituted with a waveform analyzer or other hook-flash detector to specifically detect a hook-flash signal. If the sample does not rise above the predetermined threshold, the circuit 101 continues to loop (as shown in the loop of steps 601 and 603). When a maximum threshold is reached in step 603, the method proceeds to step 605 where circuit 101 starts a timer which continues for a set period of time (T). In an embodiment, the period of time (T) is set to a duration sufficient to allow for a successful third-party connection, and for at least one ring to be completed, such as for example 1 s.

During this period, the circuit 101 monitors the signals to detect continuous noise indicative of a ringer. For example, ringers are generally represented by repeating 200 ms of continuous noise followed by 400 ms of silence. Therefore, the circuit 101 can be configured to monitor for the continuous noise. In an embodiment, the duration threshold can be set to be slightly less than the duration of a ring, such as for example 150 ms. In an embodiment, the duration threshold is set to be greater than 100 ms and less than 200 ms. This helps to ensure adequate detection of the ring, while reducing false positives from other noise sources. In an embodiment, the circuit 101 can be additionally/alternatively configured to detect the repeating noise/silence pattern. This detection can begin with the power level of the audio signal exceeding a predetermined threshold. Because more than a single ring is being detected, the duration of the detection time period should be extended in this embodiment to a length sufficient for the connection of the call as well as to capture at least more than 1 period of the ringer pattern, such as for example 1.6 s. Once initiated, the circuit 101 will examine the power level of the signal to see if it substantially conforms to the noise patterns indicative of a ring. Based on a correlation of the detected noise pattern with the expected noise pattern, a determination can be made as to whether a ring has been detected. In an embodiment, the circuit 101 can additionally/alternatively detect the ringer based on a particular frequency associated with the ringer. In an embodiment, this can be performed by computing the Fourier transform of the audio stream during the noise portion, and compare the result to an expected frequency value.

Step 605 is followed by step 607 and in this step, if the sample meets the criteria of the monitoring described above, the circuit 101 determines that an attempt to make a three-way call attempt has occurred and appropriate action is taken in step 609. If the circuit 101 determines that the sample did not meet the criteria of the monitoring described above, the system determines that no three-way call attempt has occurred and continues to monitor for events indicative of an attempt to make a three-way call attempt (step 601).

Figure 7:
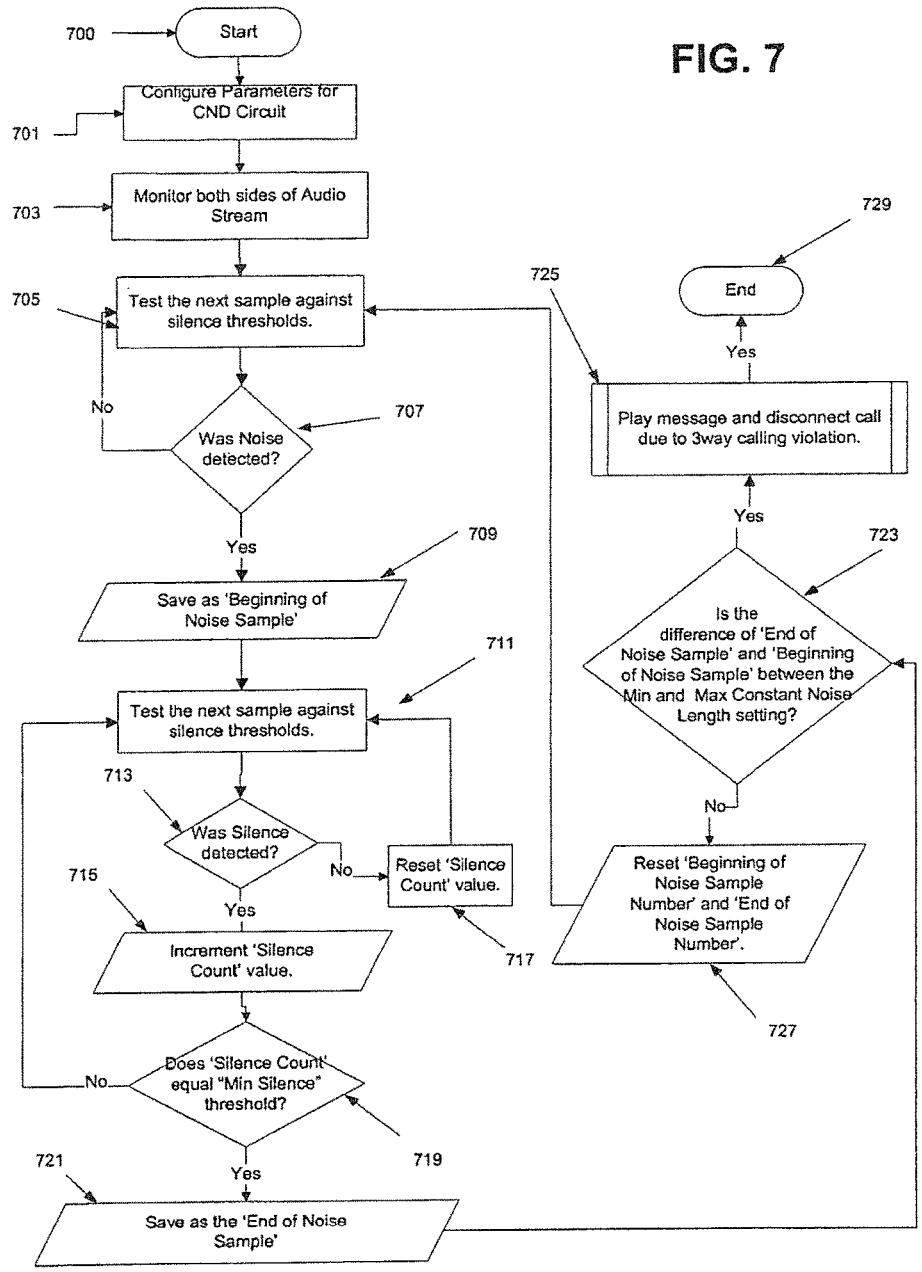
FIG. 7 depicts a flow chart for an alternate method of implementing the present invention to detect attempts to circumvent a three-way call detection system and method by generating a continuous noise during the three-way call attempt.

Referring now to FIG. 7, there is shown another alternate method for detecting continuous noise implemented with configurable parameters such as, in one non-limiting embodiment, Continuous Noise Detection enabled, silence high threshold, silence low threshold, Maximum constant noise length, minimum constant noise length, and minimum silence threshold. Particularly, the process begins with step 700 and is followed by step 701 whereby the CND circuit 101 is configured, for example, with Continuous Noise Detection enabled, silence high threshold, silence low threshold, Maximum constant noise length, minimum constant noise length, and minimum silence threshold. Step 701 is followed by step 703 where the audio streams of calling party and the called party are monitored for noise. Preferably, the process examines a pre-determined sample size of the audio streams, such as in one non-limiting example, a sample size of 512 bytes, to determine whether the audio of the sample is above a pre-determined threshold (e.g., −20 dBm). The process continues to step 705 whereby the next sample is compared to a predetermined silence threshold and in step 707, if this sample signifies a noise event (i.e., the sample power is above a predetermined threshold) the sample is saved as time period "Beginning of Noise Sample" in step 709. If the predetermined threshold is not met (i.e., the amplitude of the sample is less than the pre-determined threshold), the process continues to monitor the streams until the audio stream exceeds the pre-determined threshold (as shown in the loop of steps 705 and 707).

Once the pre-determined threshold is reached, the process continues to monitor the stream in step 711 until the next sample in the audio stream again falls below the pre-determined threshold (silence detected). Upon detection of the audio stream falling back below the pre-determined threshold in step 713, the process increments silence count value by one in step 715. Otherwise, silence count value is reset in step 717. Next, in step 719, if the sample in the audio stream is in the silence threshold, them the sample is saved as "End of Noise Sample" in step 721. Next, in step 723, if the difference between "Beginning of Noise sample" and End of Noise Sample is within the minimum and maximum length for continuous noise, the method progresses to step 725 where a message is played to either party that they are in violating of making a three-way call and the telephone system 100 proceeds to disconnect the call. However, if step 723 is NO, then the method progresses to step 705 where the next sample is compared to a predetermined silence threshold. The method ends in step 729.

Also, and as was stated earlier in reference to the Continuous Noise Detection Algorithm, the circuit 101 may also monitor signal power to avoid false positives. Particularly, three-way call detection circuit 101 examines the audio data from the calling party as well as the called party to identify an initial period of silence followed by continuous noise and a second period of silence (also called 'three-way' event). The three-way call detection circuit 101 includes a digital signal processor 205 comprising a "continuous noise detection" algorithm (or CND Algorithm) for identifying areas in the audio stream where the signal level is continuously above a certain threshold for the time period T1, which in one non-limiting example, is set at 1500 milliseconds. However, the CND algorithm may identify some parts of the audio stream as three-way events (i.e., silence, noise followed by silence), where no three-way event had been attempted, such as for example, loud continuous speech. These events are characterized as 'false positives'. Furthermore, the CND Algorithm may include a plurality of Algorithms, such as a Power Distribution Filter (PDF) Algorithm and a Zero Crossing Filter (ZCRF) Algorithm to identify these false positives. The CND Algorithm triggers the three-way event candidate as an output set of line PCM coded samples of audio with audio duration greater than or equal to 1500 milli seconds. The PDF and ZCRF Algorithms operate on part of the PCM coded sample set. The optimal sample length used for filtering was selected as trailing 60% of the three-way event sample candidate; this resulting set of samples is further referred to as 'Audio Segment'.

The PDF Algorithm detects events that do not have signal power evenly distributed across the reported CND event time interval T2-T1. The PDF Algorithm splits the Audio Segment into a configurable number of segments, preferably of equal length. The system 100 calculates the cumulative power (i.e., the sum of absolute coded signal amplitudes for each part). The cumulative power is normalized by the length of a part. The PDF Algorithm calculates the 'distance' (i.e., a difference of resulting average amplitude values) between values of each part and ensures that the maximum distance value is lower than a predefined configurable parameter. All Audio Segments that fail the PDF check are declared as false positive three way events.

The Feature Zero crossing Rate (ZCRF) Algorithm filters out all three-way events where the Zero Crossing Rate (ZCR) is below a certain threshold that characterizes human speech. The ZCRF Algorithm calculates the number of zero-crosses (X axis crosses) of a waveform signal averaged by the number of samples in the Audio Segment. If the resulting value is greater than a preconfigured reference value, such Audio Segment is declared as a false positive three-way event.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A method for detecting an attempt to mask a three-way call, the method comprising the steps of:

monitoring an audio stream;

detecting that a power level of the audio stream falls below a predetermined threshold;
detecting that the power level of the audio stream exceeds the predetermined threshold at a first time;
detecting a next occurrence of the power level of the audio stream falling below the predetermined threshold at a second time;
calculating an elapsed time from the first time to the second time;
comparing the elapsed time to a predetermined maximum allowable period of time,
isolating energy pulses from the audio stream that exceed a predetermined magnitude;
detecting a peak energy within the energy pulses; and
extending the detected peak energy.

2. The method of claim 1, wherein the power level is signal power of the audio stream.

3. The method of claim 1, further comprising the step of:
determining a false indication of a continuous noise three-way call circumvention attempt utilizing a continuous noise detection algorithm.

4. The method of claim 3, wherein the continuous noise detection algorithm analyzes signal power of the audio stream as a PCM signal.

5. The method of claim 4, wherein the continuous noise detection algorithm includes a power distribution filter algorithm and a zero crossing filter algorithm.

6. The method of claim 5, wherein the power distribution filter algorithm detects when the signal power is not evenly distributed across the time period.

7. The method of claim 5, wherein the zero crossing filter algorithm calculates whether a zero crossing rate of the signal power is below a predetermined threshold of human speech.

8. The method of claim 1, wherein the elapsed time is calculated to be at least 1500 milliseconds (ms).

9. A method for detecting an attempt to mask a three-way call, the method comprising the steps of:
monitoring an audio stream;
detecting when a power level of the audio stream falls below a predetermined threshold;
calculating an elapsed time when the power level of the audio stream is below the predetermined threshold; and
determining whether the elapsed time exceeds a maximum allowable period of time,
isolating energy pulses from the audio stream that exceed a predetermined magnitude;
detecting a peak energy within the energy pulses; and
extending the detected peak energy.

10. The method of claim 9, wherein the power level is signal power of the audio stream.

11. The method of claim 10, further comprising the step of:
determining whether the signal power is evenly distributed across the elapsed time.

12. The method of claim 9, wherein the predetermined threshold is −20 decibels (dBm).

13. The method of claim 9, wherein the elapsed time is calculated to be at least 1500 milliseconds (ms).

14. A system for detecting an occurrence of a three-way call attempt as part of a telephone call, the system comprising:
an interface port configured to receive audio signals from a telephone; and
an energy detector configured to detect an energy of the audio signals;
an analyzer configured to analyze the detected energy; and
a determiner configured to determine whether a three-way call has been attempted based on the results of the analysis,
wherein the interface port is configured to receive the audio signals in a first format and in a second format,
wherein the energy detector receives the audio signals in the first format, and
wherein the analyzer receives the audio signals in the second format.

15. The system of claim 14, further comprising a converter configured to convert the audio signals received by the interface port in the first format to the second format, and to convert the audio signals received by the interface port in the second format to the first format.

16. The system of claim 14, further comprising an isolator configured to electrically isolate the energy detector from the interface port.

17. The system of claim 14, wherein the energy detector includes:
a peak detector configured to isolate energy pulses from the audio signals that exceed a predetermined magnitude;
a threshold detector configured to detect a peak energy within the energy pulses; and
a pulse stretcher configured to extend an output of the threshold detector.

18. The system of claim 17, wherein the threshold detector includes an operational amplifier connected between the peak detector and the pulse stretcher.

* * * * *